(12) United States Patent
Fabian et al.

(10) Patent No.: US 10,247,889 B1
(45) Date of Patent: Apr. 2, 2019

(54) OVERMOLDED BREAKOUT

(71) Applicant: TE CONNECTIVITY CORPORATION, Berwyn, PA (US)

(72) Inventors: David James Fabian, Mount Joy, PA (US); James Patrick Mosier, Palmyra, PA (US); Douglas Harold Rohde, Hershey, PA (US)

(73) Assignee: TE CONNECTIVITY CORPORATION, Berwyn, PA (US)

( * ) Notice: Subject to any disclaimer, the term of this patent is extended or adjusted under 35 U.S.C. 154(b) by 0 days.

(21) Appl. No.: 15/980,634

(22) Filed: May 15, 2018

(51) Int. Cl.
G02B 6/44 (2006.01)
G02B 6/36 (2006.01)
G02B 6/38 (2006.01)

(52) U.S. Cl.
CPC ......... G02B 6/3889 (2013.01); G02B 6/3636 (2013.01); G02B 6/4403 (2013.01)

(58) Field of Classification Search
CPC .................................................. G02B 6/3889
See application file for complete search history.

(56) References Cited

U.S. PATENT DOCUMENTS

| 5,239,609 | A | * | 8/1993 | Auteri | G02B 6/4472 385/136 |
| 5,471,555 | A | * | 11/1995 | Braga | G02B 6/3878 385/114 |
| 5,999,674 | A | * | 12/1999 | Yui | G02B 6/30 385/49 |
| 6,428,357 | B1 | * | 8/2002 | Dolinshek | H01R 43/18 29/856 |
| 6,434,315 | B1 | * | 8/2002 | Grois | G02B 6/3885 385/139 |
| 6,434,316 | B1 | * | 8/2002 | Grois | G02B 6/3879 385/139 |
| 6,571,048 | B1 | * | 5/2003 | Bechamps | G02B 6/4471 385/136 |
| 6,614,971 | B2 | * | 9/2003 | Sun | G02B 6/368 385/114 |
| 6,771,861 | B2 | * | 8/2004 | Wagner | G02B 6/4472 385/100 |
| 6,816,663 | B2 | * | 11/2004 | Daoud | G02B 6/4471 385/136 |
| 7,054,536 | B2 | * | 5/2006 | Sun | G02B 6/4476 385/114 |
| 7,228,047 | B1 | * | 6/2007 | Szilagyi | G02B 6/3878 385/134 |

(Continued)

Primary Examiner — Rhonda S Peace

(57) ABSTRACT

A cable breakout comprising: (a) a cable comprising a plurality of conductors; (b) a skeleton component having a first and second end, a substrate, conductor management (CM) members defined on said substrate, and at least a first protrusion on a first side of said substrate and a second protrusion on a second side of said substrate, said CM members being configured to receive said cable at said first end and to hold each of said plurality of conductors in place at said second end; and (c) an overmolded component overmolding said skeleton component including at least a portion of said CM members and said conductors, said overmolded component having an outer surface that defines essentially the form factor of said cable breakout, wherein at least one of said first and second protrusions extend to said outer surface.

20 Claims, 5 Drawing Sheets

(56) References Cited

U.S. PATENT DOCUMENTS

| | | | | |
|---|---|---|---|---|
| 7,461,981 B2* | 12/2008 | Yow, Jr. | G02B 6/4471 | 385/76 |
| 8,571,367 B2* | 10/2013 | Van Der Meulen | G02B 6/4477 | 385/100 |
| 8,678,668 B2* | 3/2014 | Cooke | B29C 45/14467 | 385/114 |
| 8,842,961 B2* | 9/2014 | Thackston | G02B 6/4471 | 385/137 |
| 8,958,673 B2* | 2/2015 | Cline | G02B 6/4471 | 385/100 |
| 9,360,635 B2* | 6/2016 | Barwicz | G02B 6/3652 | |
| 9,417,420 B2* | 8/2016 | Fisher | G02B 6/4477 | |
| 2005/0158005 A1* | 7/2005 | Otsuka | G02B 6/3865 | 385/137 |
| 2007/0172175 A1* | 7/2007 | Imanbayev | G02B 6/3839 | 385/78 |
| 2014/0140671 A1* | 5/2014 | Islam | G02B 6/4471 | 385/101 |
| 2017/0322380 A1* | 11/2017 | Levy | G02B 6/3851 | |
| 2017/0371121 A1* | 12/2017 | Marchek | G02B 6/4471 | |

* cited by examiner

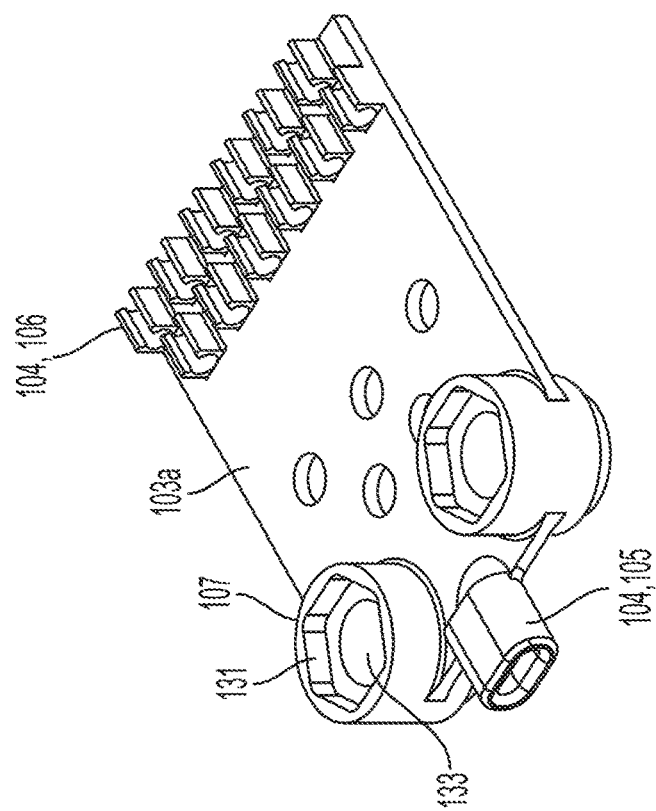
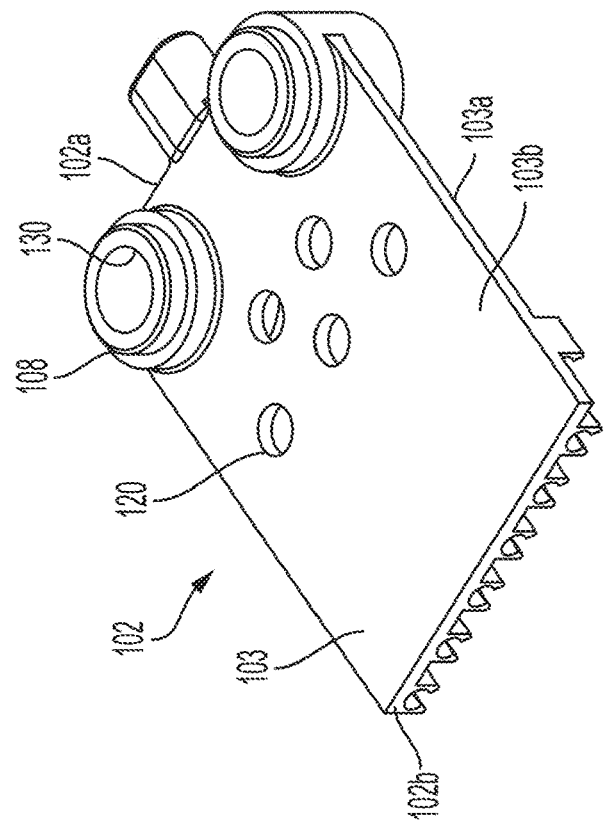
FIG. 1B
FIG. 1A

OVERMOLDED BREAKOUT

FIELD OF INVENTION

The invention relates generally to a device for housing and controlling the bending of optical fibers split from a bundle of fibers.

BACKGROUND

In fiber optic communications networks, optical fibers are used to transmit signals throughout the network. Because optical fibers are thin, multiple optical fibers are often routed together in groups of fibers that are connected or bundled together. One arrangement of multiple optical fibers is a ribbon fiber, which is a group of optical fibers aligned in a single plane and held together by a film.

As is known, at a certain point along the ribbon cable, access to individual fibers is required for connectorization, splicing or divergent routing of the discrete fibers. Access to individual fibers requires separating them from the ribbon cable at a point referred to as the "break-out point." Although the discrete fibers are typically enclosed in a buffer tube to protect them and minimize their bending, at the break-out point, the individual fibers are neither contained in their buffer tube, nor secured in the ribbon cable. Consequently, the fibers tend to be particularly fragile at this point, and thus must be protected by holding them in a certain position relative to the ribbon cable to avoid excessive bending. To this end, "breakout" or "fanout" devices have been developed.

Conventional breakout devices typically have a housing that is trapezoidal in shape with the ribbon cable entering the short side of the trapezoid housing and discrete fibers leaving the longer side. The device has a series of internal channels to guide and control the discrete fibers as the break out from the ribbon cable.

Although traditional breakout devices are effective in protecting fibers from excessive bending, Applicants recognize that such devices are typically customized for a particular application, and are specific to the size of the ribbon cable and the number of discrete fibers that are broken out from the ribbon cable. Such specificity may be limiting. For example, there may be applications in which just a few fibers need to be fanned out from the ribbon and the rest of the ribbon cable can otherwise be left intact. In such applications, the breakout device must be customized with a specific number of channels to accommodate the few fibers that need to be fanned out.

Applicants realize that such customized breakout devices are inconvenient and expensive to inventory and fabricate in small quantities. Therefore, Applicants have determined that breakout device is needed which is more flexible to accommodate different cables and breakout configurations, and which is more easily manufactured. The present invention fulfills this need among others.

SUMMARY OF INVENTION

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

In one embodiment, the invention relates to a cable breakout comprising: (a) a cable comprising a plurality of conductors; (b) a skeleton component having a first and second end, a substrate, conductor management (CM) members defined on the substrate, and at least a first protrusion on a first side of the substrate and a second protrusion on a second side of the substrate, the CM members being configured to receive the cable at the first end and to hold each of the plurality of conductors in place at the second end; and (c) an overmolded component overmolding the skeleton component including at least a portion of the CM members and the conductors, the overmolded component having an outer surface that defines essentially the form factor of the cable breakout, wherein at least one of the first and second protrusions extend to the outer surface.

In another embodiment, the invention relates to a process for preparing a cable breakout for connecting cables of conductors, the process comprising: (a) disposing a cable comprising a plurality of conductors on a skeleton component having a first and second end, a substrate, conductor management (CM) members defined on the substrate, and at least first protrusion on one the of the substrate and a second protrusion on the opposite side of the substrate, the CM members being configured to receive the cable at the first end and to hold each of the plurality of conductors in place on the second end of the substrate, the first protrusion being configured to receive a protrusion having the same form factor as the second protrusion; (b) selecting one of a plurality of molds, each mold having a different interior form factor, (c) disposing the skeleton component in the selected mold; and (d) overmolding the skeleton including at least a portion of the CM members and the conductors to form an overmolded component, the overmolded component having an outer surface that defines essentially the form factor of the cable breakout, wherein the first and second protrusions extend to the outer surface.

BRIEF DESCRIPTION OF DRAWINGS

FIGS. 1A and 1B show different sides of one embodiment of the skeleton of the present invention.

DETAILED DESCRIPTION

Figure 2B:
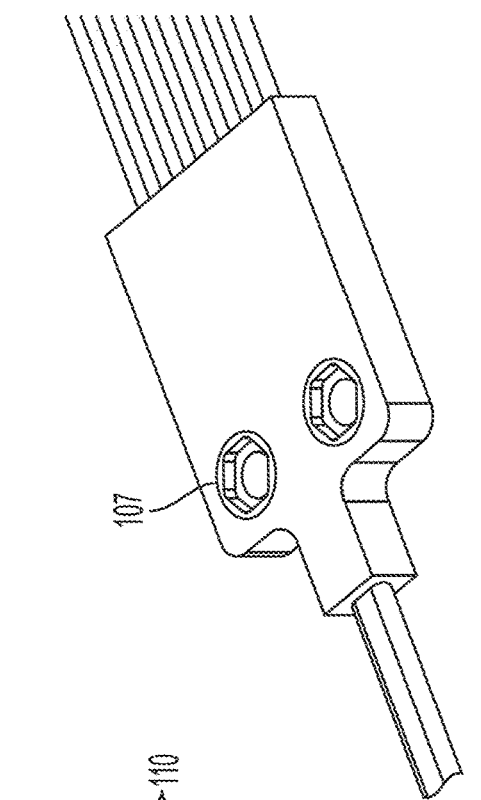
FIGS. 2A and 2B show a completed overmolded breakout using the skeleton of FIGS. 1A and 1B.
Figure 2A:
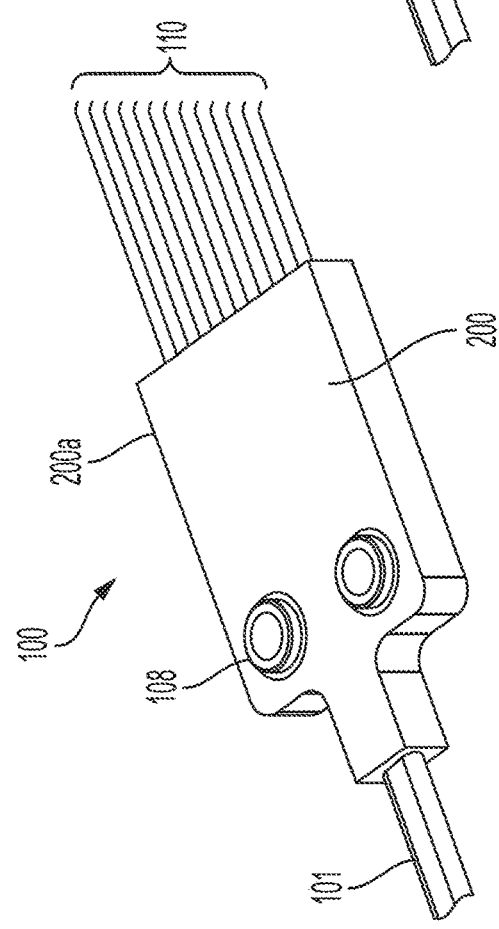

Referring to FIGS. 1A, 1B, 2A, and 2B, one embodiment of the cable breakout 100 of the present invention is shown. The cable breakout 100 comprises a cable 101 comprising a plurality of conductors 110, and a skeleton component 102 having first and second ends 102a, 102b. The skeleton component 102 comprises a substrate 103, conductor management (CM) members 104 defined on the substrate 103, and at least a first protrusion 107 on a first side 103a of the substrate 103, and a second protrusion 108 on a second side 103b of the substrate 103. The CM members 104 are configured to receive the cable at the first end and to hold each of the plurality of conductors in place on the substrate and position each of the conductors along the second end. In this embodiment, the first protrusion is configured to releasably interengage with a protrusion having the same form factor as the second protrusion. Finally, the cable breakout 100 comprises an overmolded component 200 overmolding the skeleton component including at least a portion of the CM members and the conductors. The overmolded component having an outer surface 200a that defines essentially the form factor of the breakout. At least one of the first and second protrusions extend to the outer surface 200a, as shown in FIGS. 2B and 2A. These features are considered in greater detail below along with selected alternative embodiments.

The skeleton 102 functions as the structural support within the overmolded component. Essentially, the skeleton acts as an infrastructure to provide support to the breakout. Although the skeleton has various embodiments, in one embodiment, the skeleton is a unitary component as shown in FIGS. 1A, 1B, 3A and 3B. Alternatively, the skeleton may comprise an assembly of discrete components. The skeleton 102 has a first end 102a which receives the cable comprising multiple conductors, and a second end 102b at which the individual conductors are arranged and spaced from each other relative to their position at the first end 102a.

In one embodiment, the skeleton comprises a substrate 103. The substrate functions as the backbone or base on which the conductor management (CM) members are mounted. In one embodiment, the substrate is essentially planar, although other embodiments are possible within the scope of the invention, including, for example, a curved substrate, or a three-dimensional substrate (e.g., a tube,). In one embodiment, the substrate 103 comprises a first side 103a and a second side 103b.

Because the substrate functions as the backbone of the skeleton, it needs to be rigid, and, thus, it should comprise a relatively rigid material such as, for example, a metal or a polymer which stays rigid, not only at the expected operating temperatures, but also at the overmolding temperatures discussed below. Suitable materials will be obvious to those of skill in the art in light of this disclosure.

As mentioned above, the substrate supports and provides a base for various CM members. The CM members function to manage the cable at the first end 102a of the skeleton, and manage each of the multiple conductors in the cable such that the multiple conductors are spaced apart and arranged in a certain way at the second end 102b of the skeleton. The CM members may be discrete or they may be integrally molded with the substrate.

In one embodiment, the CM members comprise a tubular member 105 at the first end 102a of the skeleton. The tubular member 105 is configured to receive the cable and restrict its movement. The tubular member 105 may have various embodiments. For example, in FIGS. 1A and 1B, the tubular member 105 is configured to receive a ribbon cable, and, consequently, has an oval cross-section. In this particular embodiment, the skeleton is also configured such that the breakout of the conductors is performed just on the first side 103a of the substrate 103. Accordingly, the tubular member 105 is positioned on just one side, i.e. the first side 103a of the substrate.

It should be understood, however, that other embodiments are possible. For example, referring to FIGS. 3A and 3B, the tubular member 305 is configured to receive a jacketed cable, and consequently, has an essentially round cross-section. Additionally, in this particular configuration, the skeleton is configured to have conductor breakouts on both sides of the substrate, and, accordingly, the tubular member 305 is configured such that it is essentially centered on the edge of the substrate thereby allowing conductors in the cable to be arranged on either side of the substrate. Still other configurations of the tubular member will be obvious to those of skill in the art in light of this disclosure.

The CM members are configured, not only to hold and control the cable, but also to hold and manage one or more of the individual conductors such that the conductors are spaced apart at the second end 302b of the skeleton as described above. To this end, in one embodiment, as shown in FIGS. 1A, 1B, 3A, and 3B, the CM members comprise grooves 106, 306 for receiving individual conductors from the cable assembly. Specifically, referring to FIG. 1B, the CM members comprise 12 grooves, which protrude from the first side 103b of the substrate 103. In this particular embodiment, the grooves are staggered so as to more closely pack the individual conductors at the second end 102b of the skeleton 102. It should be understood, however, that other embodiments are possible. For example, if a greater separation is desired among the conductors, then the grooves can be aligned side-by-side and not staggered as shown. Conversely, if a closer packing is required, then additional rows of grooves can be used to further minimize the distance between individual conductors. Again, one of skill in the art will readily understand the various configurations possible in light of this disclosure.

Figure 3B:
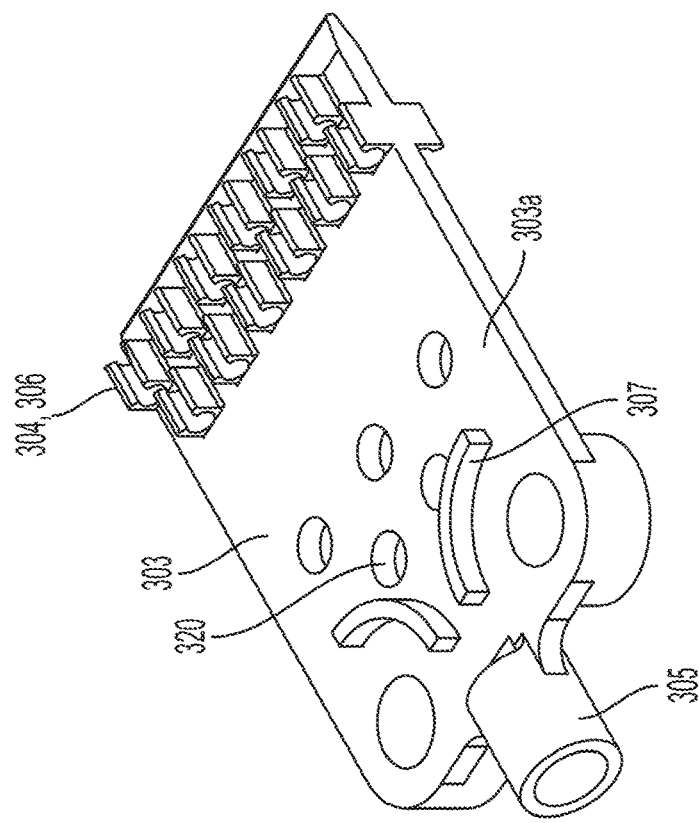
FIGS. 3A and 3B show different sides of another embodiment of the skeleton of the present invention.
Figure 3A:
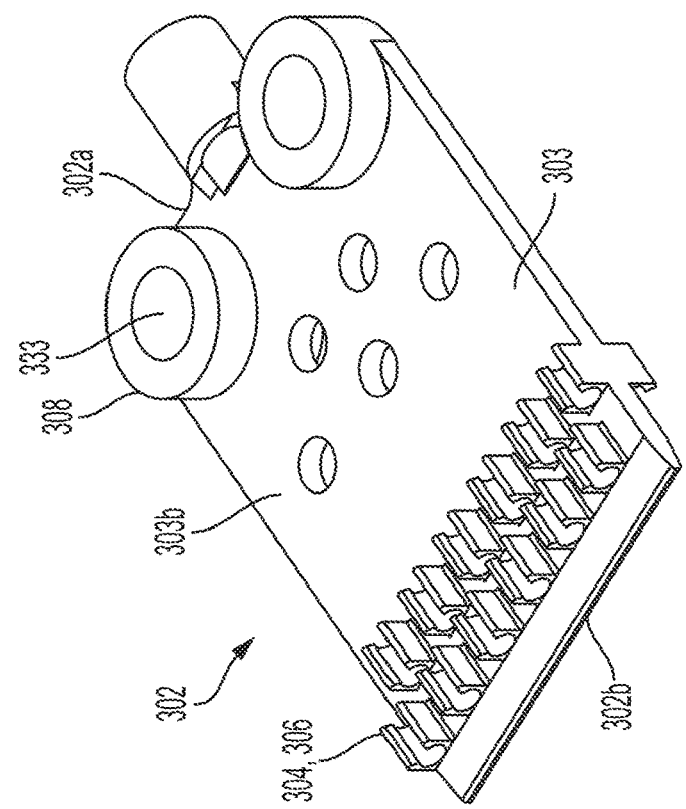
Figure 4B:
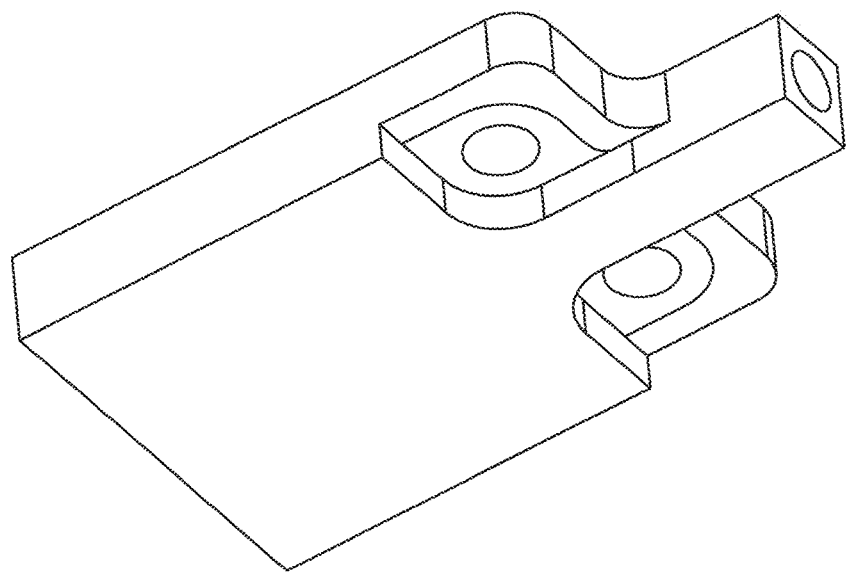
FIGS. 4A and 4B show the skeleton of FIGS. 3A and 3B overmolded.
Figure 4A:
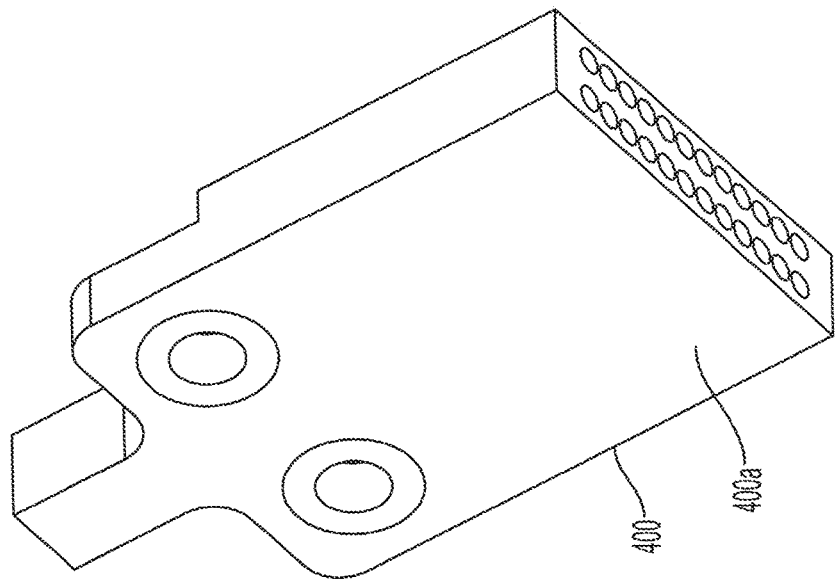

In the embodiment of FIG. 1B, the CM members are disposed on just the first side 103a of the substrate 103. It should be understood, however, that other embodiments are possible, including, for example, having the CM members disposed on both sides of the substrate, thereby allowing the conductors to be arranged on either side of the substrate. Such an embodiment is shown in FIGS. 3A and 3B. As shown, essentially the identical formation of CM members 304 (i.e., groves 306) for arranging the individual conductors are disposed on both the first side 303a of the substrate 303 and the second side 303b of the same substrate. Obviously, the advantage to arranging fibers conductors on either side of the substrate is to provide a breakout with multiple rows of conductors as shown in FIG. 4A.

It should be noted that the groves may be configured in different ways to hold conductors of various thicknesses. For example, in one embodiment, the conductors are jacketed or coated, and thus their thickness is greater than just that of the conductor, and consequently, the groove should be sized to receive such a coated/jacketed conductor. Alternatively, the conductors may be bare and not have any coating/jacket in which case the grooves would be narrower to accommodate just the conductor. In yet another embodiment, the CM members are not grooves, but tubular members. In one embodiment, each conductor is associated with a particular CM member, while in another embodiment, the conductors are grouped and positioned with a single CM member at the second end. Again, other embodiments will be obvious to those of skill in the art in light of this disclosure.

In one embodiment, the breakout of the present invention comprises one or more of the protrusions that extend from the substrate up to the periphery of the overmolded component. In other words, distal end of the protrusion(s) is not overmolded and remains accessible from the outside of the overmolded component. The purpose the function of these protrusions is to facilitate the connection of the breakout to structures and/or to other breakout assemblies. For example, in one embodiment, the protrusions define a borehole 133, 333 to receive a fastener to secure the breakout to a cabinet or other support structure.

In another embodiment, as shown in FIGS. 1A and 1B, the protrusions have additional features which promote their interlocking with other similarly configured breakouts. For example, in FIG. 1A, the protrusion 108 comprises a circular portion 130, which is configured to be received in a hexagonal receptacle 131 as shown in FIG. 1B. In this way, identical breakouts can be snapped together by having the circular portion 130 snap into the hexagonal receptacle 131. It has been found that a hexagonal receptacle, as compared to a circular receptacle, tends to hold the mating protrusion adequately, yet does not bind as a circular receptacle might, thus preventing disengagement, or otherwise make disengagement very difficult. Although a hexagonal receptacle as shown, it should be understood that other configurations are possible, including, for example, any circular/polygon configuration, including, for example, having polygon portions being received in circular receptacles.

It should also be understood that the protrusion configuration of the embodiment of FIGS. 1A and 1B not only facilitates interengaging breakouts of similar configuration to form breakout assemblies, but also allows the entire assembly to be mounted to a support structure as the boreholes 133 of all the protrusion of a breakout assembly align, thereby defining a passage through the breakout assembly for a fastener.

Referring to the embodiments of FIGS. 1A, 1B, 3A and 3B, a series of holes 120, 320 are defined in the substrate 103, 303. These holes are large enough to facilitate fluid flow of the overmolded material from one side of the substrate to the other such that the overmolded material on either side of the substrate is joined, thereby improving the structural integrity of the overmolded component.

As shown in FIGS. 3A and 3B, the protrusions in this embodiment are different from those of FIGS. 1A and 1B and do not facilitate entering engagement. Specifically, in FIG. 3A, the second side 303b of the substrate 303 is shown with protrusions 308 extending away from the substrate 303. The protrusions 308 extend far enough such that it presents itself on the periphery of the overmolded of the periphery 400a of the overmolded component 400 as shown in FIG. 4A. Referring to FIG. 3B, the protrusion 307 extending from the first side 303B of the substrate 303 is significantly different from that of protrusion 308 in that it does not encircle the borehole 333, but rather functions to guide the conductors as they breakout from the cable at the first and 302a of the skeleton and extend to the second end 302b of the skeleton 302. In this embodiment, the protrusion 307 may or may not be entirely covered with the overmolded component.

The cable may be any known cable having a plurality of conductors. Examples of suitable cables include, for example, a ribbon cable and a jacketed cable having multiple conductors. The individual conductors, which may or may not be coated, are jacketed as described above.

The skeleton is overmolded using known techniques to form an overmolded breakout. Generally, the overmolding process involves first disposing the cable comprising a plurality of conductors on a skeleton component as described above. Next, each of the conductors in the cable is arranged on a skeleton using the CM members as described above. Specifically, in one embodiment, each individual conductor is disposed in a groove, and thus the conductors are spread apart and arranged at the second end of the skeleton.

Next, the skeleton is disposed in a mold, and, finally, the overmolded material in fluid form is injected or poured into the mold such that it covers a skeleton to form the overmolded component 200, 400. The overmolded component has an outer surface or periphery 200a, 400a that defines essentially the form factor of the cable breakout.

The overmolding material may be any known material suitable for overmolding, including, for example, Henkel TECHNOMELT 657.

Figure 5:
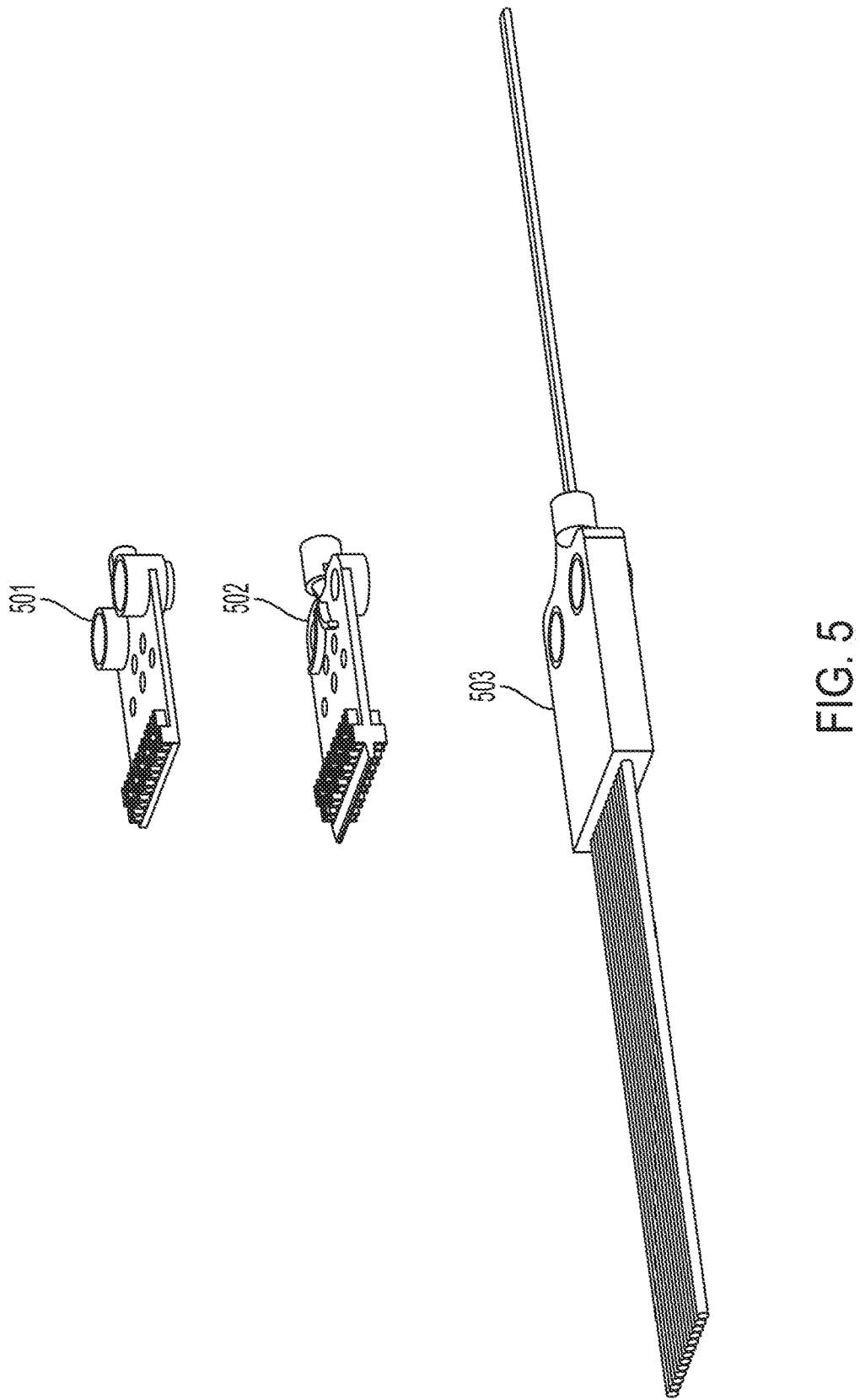
FIG. 5 shows how different skeletons can be overmolded using the same mold to form a breakout having the same form factor.

Overmolding a skeleton component has a number of advantages. For example, in one embodiment, the same mold can be used to overmolded different skeleton component. For example, referring to FIG. 5, different skeleton component 501 and 502 are shown (which correspond to embodiments of FIGS. 1A & 1B and FIGS. 3A & 3B, respectively), which are ultimately overmolded using the same mold to a form a breakout 503 having the same form factor. Alternatively, the same skeletons can be used with different molds to form breakouts having different form factors even though the skeletons of the same. Indeed, overmolding imparts a great deal of flexibility in the manufacturing process.

Having thus described a few particular embodiments of the invention, various alterations, modifications, and improvements will readily occur to those skilled in the art. Such alterations, modifications, and improvements as are made obvious by this disclosure are intended to be part of this description though not expressly stated herein, and are intended to be within the spirit and scope of the invention. Accordingly, the foregoing description is by way of example only, and not limiting. The invention is limited only as defined in the following claims and equivalents thereto.

What is claimed is:

1. A cable breakout comprising:
   a cable comprising a plurality of conductors;
   a skeleton component having a first and second end, a substrate, conductor management (CM) members defined on said substrate, and at least a first protrusion on a first side of said substrate and a second protrusion on a second side of said substrate, said CM members being configured to receive said cable at said first end and to hold each of said plurality of conductors in place at said second end; and
   an overmolded component overmolding said skeleton component including at least a portion of said CM members and said conductors, said overmolded component having an outer surface that defines essentially the form factor of said cable breakout, wherein at least one of said first and second protrusions extend to said outer surface.

2. The cable breakout of claim 1, wherein said skeleton is a unitary component.

3. The cable breakout of claim 1, wherein said CM members configured to receive said cable comprises a tube portion disposed at said first end.

4. The cable breakout of claim 1, wherein at least a portion of said CM members are grooves configured to hold said conductors.

5. The cable breakout of claim 4, wherein said grooves are located on just one of said first or second sides.

6. The cable breakout of claim 4, wherein said grooves are located on both said first and second sides.

7. The cable breakout of claim 1, wherein said first and second protrusions are hollow to receive a mounting fastener.

8. The cable breakout of claim 7, said first protrusion being configured to receive a protrusion having the same form factor as said second protrusion.

9. The cable breakout of claim 8, wherein said first protrusion defines a concentric recess, and said second protrusion defines a concentric protrusion.

10. The cable breakout of claim 9, wherein said concentric recess has polygon perimeter and said concentric protrusion has circular perimeter.

11. The cable breakout of claim 1, wherein said conductors are fibers.

12. The cable breakout of claim 11, wherein said cable is a ribbon cable.

13. The cable breakout of claim 11, wherein said CM members are configured to breakout fibers in a ribbon to a routing sequence of discrete fibers presented at said second end.

14. A process for preparing a cable breakout for connecting cables of conductors, said process comprising:
 disposing a cable comprising a plurality of conductors on a skeleton component having a first and second end, a substrate, conductor management (CM) members defined on said substrate, and at least first protrusion on one said of said substrate and a second protrusion on the opposite side of said substrate, said CM members being configured to receive said cable at said first end and to hold each of said plurality of conductors in place on said second end of said substrate, said first protrusion being configured to receive a protrusion having the same form factor as said second protrusion;
 selecting one of a plurality of molds, each mold having a different interior form factor;
 disposing said skeleton component in said selected mold; and
 overmolding said skeleton including at least a portion of said CM members and said conductors to form an overmolded component, said overmolded component having an outer surface that defines essentially the form factor of said cable breakout, wherein said first and second protrusions extend to said outer surface.

15. The process of claim 14, wherein said CM members configured to receive said cable comprises a tube portion disposed at said first end.

16. The process of claim 14, wherein at least a portion of said CM members are grooves configured to hold said conductors.

17. The process of claim 16, wherein said grooves are located on just one of said first or second sides.

18. The process of claim 16, wherein said grooves are located on both said first and second sides.

19. The process of claim 14, wherein said conductors are fibers, wherein said CM members are configured to breakout fibers in a ribbon to a routing sequence of discrete fibers presented at said second end.

20. The process of claim 14, wherein said first and second protrusions are hollow to receive a mounting fastener, and wherein said first protrusion being configured to receive a protrusion having the same form factor as said second protrusion.

* * * * *